(12) United States Patent
Takahashi

(10) Patent No.: US 6,385,528 B1
(45) Date of Patent: May 7, 2002

(54) CURVE APPROACH SPEED CONTROL APPARATUS

(75) Inventor: Akira Takahashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/664,735

(22) Filed: Sep. 19, 2000

(30) Foreign Application Priority Data

Sep. 21, 1999 (JP) .......................................... 11-267732

(51) Int. Cl.$^7$ ............................................. G01C 21/00
(52) U.S. Cl. .......................................... 701/93; 701/70
(58) Field of Search ............................. 701/70, 72, 45, 701/93, 207; 340/438, 441

(56) References Cited

U.S. PATENT DOCUMENTS

| | | | | |
|---|---|---|---|---|
| 5,315,295 A | * | 5/1994 | Fujii | 340/936 |
| 5,742,240 A | * | 4/1998 | Asanuma et al. | 340/995 |
| 5,742,917 A | | 4/1998 | Matsuno | 701/69 |
| 5,748,476 A | * | 5/1998 | Sekine et al. | 364/449 |
| 5,978,731 A | * | 11/1999 | Matsuda | 701/208 |
| 6,070,121 A | * | 5/2000 | Matsuda | 701/205 |
| 6,138,084 A | | 10/2000 | Mine | 702/157 |
| 6,208,927 B1 | | 3/2001 | Mine et al. | 701/70 |

FOREIGN PATENT DOCUMENTS

| | | |
|---|---|---|
| JP | 4-236699 | 8/1992 |
| JP | 8-2274 | 1/1996 |
| JP | 11-2528 | 1/1999 |
| JP | 11-83501 | 3/1999 |
| JP | 2000-28373 | 1/2000 |

* cited by examiner

*Primary Examiner*—Michael J. Zanelli
(74) *Attorney, Agent, or Firm*—Smith, Gambrell & Russell, LLP

(57) ABSTRACT

The smoothing correction unit (27*f*), when it recognizes that a plurality of nodes are set in the same curve, reads the allowable approach speed of the node of interest and the allowable approach speeds of the preceding and following nodes, compares the allowable approach speed of the node of interest, an average of the allowable approach speeds of the node of interest and the preceding node, and an average of the allowable approach speeds of the node of interest and the following node, sets a median value of the three values as the allowable approach speed of the node of interest, thereby smoothing the allowable approach speeds that are set for the respective nodes in the same curve.

10 Claims, 6 Drawing Sheets

FIG.3

| START | NUMBER OF NODES OUTPUT n | CAR POSITION, EAST LONGITUDE | CAR POSITION, NORTH LATITUDE | NODE POSITION FROM CAR (EAST LONGITUDE) | NODE POSITION FROM CAR (NORTH LATITUDE) | INTER-SECTION FLAG | ROAD KIND | ROAD WIDTH | NODE POSITION FROM CAR (EAST LONGITUDE) | NODE POSITION FROM CAR (NORTH LATITUDE) | INTER-SECTION FLAG | ROAD KIND | ROAD WIDTH | NODE POSITION FROM CAR (EAST LONGITUDE) | NODE POSITION FROM CAR (NORTH LATITUDE) | INTER-SECTION FLAG | ROAD KIND | ROAD WIDTH | ... | NODE POSITION FROM CAR (EAST LONGITUDE) | NODE POSITION FROM CAR (NORTH LATITUDE) | INTER-SECTION FLAG | ROAD KIND | ROAD WIDTH | END |

{ DATA ON NODE IMMEDIATELY AFTER CAR }
{ DATA ON NODE IMMEDIATELY BEFORE CAR }
{ DATA ON NODE TWO NODES IN FRONT OF CAR }
{ DATA ON NODE(N-1) NODES IN FRONT OF CAR }

CURVE APPROACH SPEED CONTROL APPARATUS

BACKGROUND OF THE INVENTION

1. Field of the Invention

The present invention relates to a curve approach speed control apparatus which smoothes out allowable approach speeds calculated for respective nodes based on a plurality of data on the nodes lying consecutively in the same curve.

2. Description of the Related Art

A vehicle traveling system has been proposed in Japanese Patent Unexamined Publication No. Hei. 4-236699(JP-A 4-236699) which calculates an allowable approach speed for a curve in front by using data (node data) on points (nodes) represented on a road map in a navigation device, detects an overspeed status for the curve in front which is higher than the allowable approach speed, and performs an alarm or deceleration control.

The applicant of this invention has proposed in Japanese Patent Unexamined Publication No. Hei. 11-2528(JP-A-11-2528) a method for calculating a curve's radius of curvature for each node based on a plurality of node data output from the navigation device.

The road map data of the navigation device often has a plurality of nodes in the same curve.

Not all of these nodes, however, necessarily represent the center of the road and they have some variations in the direction of road width. Hence, there are some variations in the curve's radius of curvature calculated for each node, and this in turn results in variations within the same curve among the allowable approach speeds calculated based on the curve's radius of curvature of each node. In some cases, the allowable approach speed for one node may become extremely low, making the alarm and deceleration control for that node more prone to be activated, rendering the alarm and deceleration control very sensitive.

To prevent this, the allowable approach speeds calculated for the nodes in the same curve may be simply averaged. In that case, the averaged value is strongly influenced by a node that has a large allowable approach speed, i.e., a node which is calculated to have a curve's radius of curvature close to a straight line. This gives rise to a problem of an unresponsive alarm and deceleration control.

SUMMARY OF THE INVENTION

The present invention has been accomplished under these circumstances, and provides a curve approach speed control apparatus which, even when a plurality of nodes are set in the same curve, can correct variations of allowable approach speeds that are set for individual nodes and perform appropriate alarm and deceleration controls that match the actual curve.

To achieve the above objective, a curve approach speed control apparatus according to a first aspect of the present invention, which calculates, based on a plurality of node data for a road in front output from a navigation device, at least a radius of curvature of a curve in front to be negotiated and sets an allowable approach speed for the curve based on the curve's radius of curvature, comprises a smoothing correction unit to smooth, between adjacent nodes, allowable approach speeds calculated for a plurality of nodes consecutively set in the same curve.

With this configuration, where a plurality of nodes are consecutively set in the same curve, the allowable approach speeds calculated for the respective nodes are smoothed out between adjacent nodes.

In a second aspect of a curve approach speed control apparatus according to the first aspect of the present invention, the smoothing correction unit compares three values, the three values comprising an average of an allowable approach speed calculated for the node of interest and an allowable approach speed calculated for a preceding node, an average of the allowable approach speed calculated for the node of interest and an allowable approach speed calculated for a following node, and the allowable approach speed calculated for the node of interest, and sets a median value of the three values as the allowable approach speed of the node of interest.

With this configuration, the three values, which comprise an average of an allowable approach speed calculated for the node of interest and an allowable approach speed calculated for a preceding node, an average of the allowable approach speed calculated for the node of interest and an allowable approach speed calculated for a following node, and the allowable approach speed calculated for the node of interest, are compared and a median value of the three values is set as the allowable approach speed of the node of interest.

In a third aspect of a curve approach speed control apparatus according to the first aspect of the present invention, the smoothing correction unit sets as an allowable approach speed of a node of interest an average of the allowable approach speed calculated for the node of interest at a start of the curve and an allowable approach speed calculated for a following node.

With this configuration, the allowable approach speed for the node of interest lying at the start of the curve is set with the average of an allowable approach speed calculated for the node of interest at the start of the curve and an allowable approach speed calculated for the following node.

In a fourth aspect of a curve approach speed control apparatus according to any one of the first to third aspect of the present invention, the smoothing correction unit compares an allowable approach speed calculated for a node of interest at an end of the curve with an average of the allowable approach speed calculated for the node of interest and an allowable approach speed calculated for a preceding node, and sets whichever is a larger value as an allowable approach speed for the node of interest.

With this configuration, the allowable approach speed for the node of interest lying at the end of the curve is compared with the average of an allowable approach speed calculated for the node of interest at the end of the curve and an allowable approach speed calculated for the preceding node, and whichever is a larger value is set as the allowable approach speed for the node of interest.

In a fifth aspect of a curve approach speed control apparatus according to any one of the first to third aspect of the present invention, when a node interval of the node of interest is equal to or larger than a set value corresponding to a road width, the smoothing correction processing is not performed.

With this configuration, when the node interval is equal to or larger than the set value corresponding to the road width, the smoothing processing is not performed and the allowable approach speeds calculated for the respective nodes are applied as is.

BRIEF DESCRIPTION OF THE DRAWINGS

FIG. 3 is an explanatory diagram of node data output from a navigation device;

DETAILED DESCRIPTION OF THE PREFERRED EMBODIMENT

Figure 1:
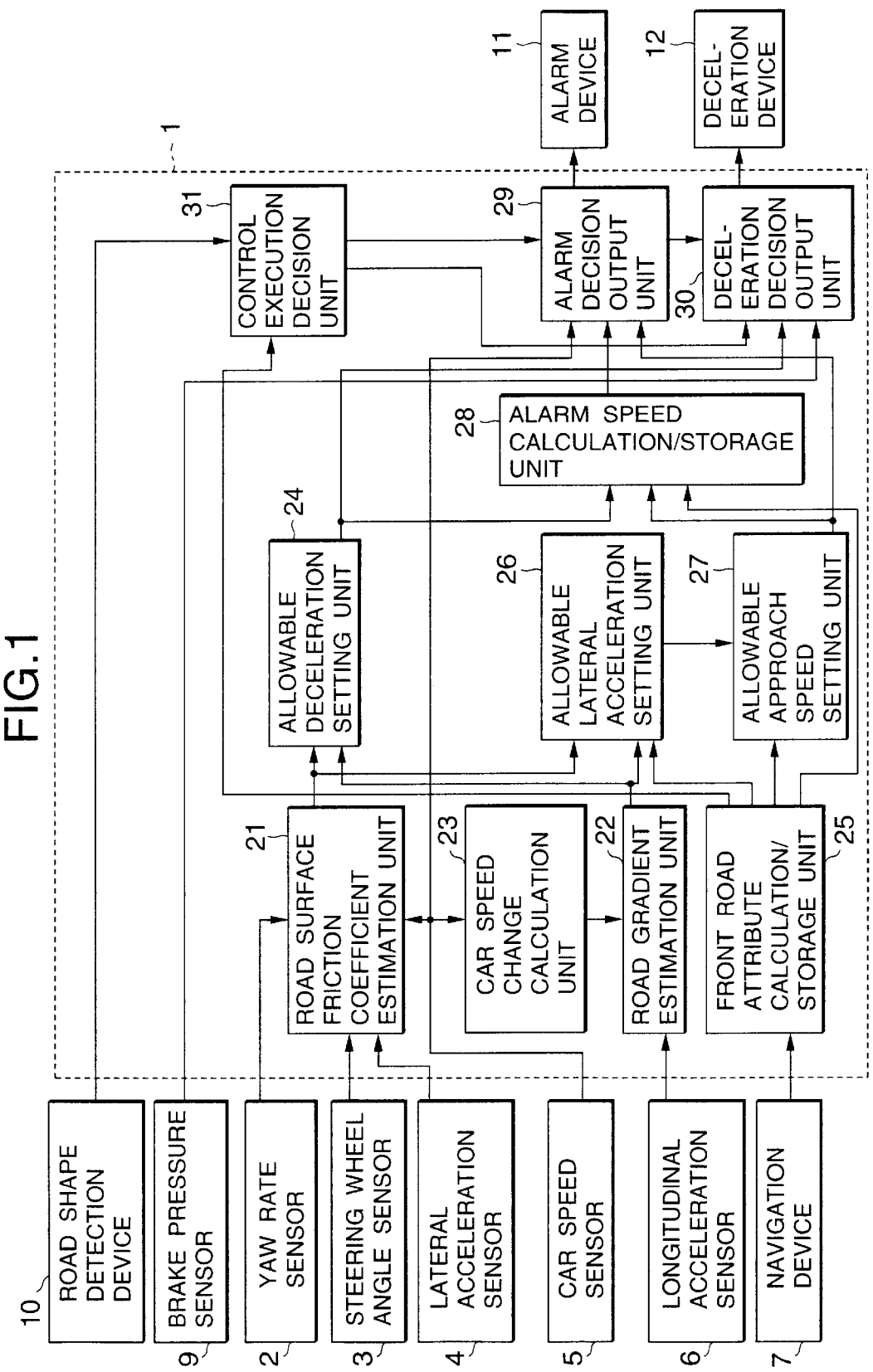
FIG. 1 is a functional block diagram of a control unit installed in the curve approach speed control apparatus.

Now, one embodiment of the present invention will be described by referring to accompanying drawings. FIG. 1 shows a functional block diagram of a control unit installed in the curve approach speed control apparatus.

A control unit 1 of the curve approach speed control apparatus receives at its input side various data including a yaw rate τ detected by a yaw rate sensor 2, a rudder angle δf detected by a steering wheel angle sensor 3, a lateral acceleration Gy detected by a lateral acceleration sensor 4, a car speed V detected by a car speed sensor 5, a longitudinal acceleration detected by a longitudinal acceleration sensor 6, and a brake pressure detected by a brake pressure sensor 9. The control unit 1 also receives signals from a navigation device 7 and a road shape detection device 10.

As shown in FIG. 3, the navigation device 7 periodically (every 500 ms, for example) issues information including a node number n along a car travel route, an east longitude and a north latitude of car position, data on a node directly after the car, data on a node directly before the car, data on a second node in front of the car, data on a (n−1)th node in front of the car.

The road shape detection device 10 detects the state of a curve (direction of curve, radius of curvature, etc.) of the road in front by using a CCD camera and outputs the information to the control unit 1.

Based on the information detected by the sensors 2–6, 9, the navigation device 7 and the road shape detection device 10, the control unit 1 performs calculation to check whether the car can negotiate the curve in front stably when it enters the curve at the present speed, and drives an alarm device 11 such as a buzzer, a voice alarm or an alarm lamp to alert the operator, if necessary.

When the speed must be lowered forcibly, a deceleration command is issued to a deceleration device 12. The deceleration device 12, according to the deceleration command from the control unit 1, performs a deceleration control such as downshifting of the transmission, lowering the engine torque and applying brake.

In the control unit 1 shown in FIG. 1, a road surface friction coefficient estimation unit 21 estimates a road surface friction coefficient μ based on parameters representing the behavior of the car, such as yaw rate τ, rudder angle δf, lateral acceleration Gy and car speed V, by using a calculation method disclosed in Japanese Patent Unexamined Publication No. Hei. 8-2274(JP-A-8-2274) already filed by the applicant of this invention. A road gradient estimation unit 22 estimates a road gradient SL according to the rate of change of the car speed V for each set duration of time calculated by a car speed change calculation unit 23 and to the longitudinal acceleration.

Based on the road condition determined from the road surface friction coefficient μ and the road gradient SL, an allowable deceleration setting unit 24 sets an allowable deceleration XgLim for the car. The method of estimating the road gradient SL and the method of calculating the allowable deceleration XgLim are described in Japanese Patent Unexamined Publication No. Hei. 11-83501(JP-A-11-83501) already filed by the applicant of this invention and therefore the explanations are omitted here.

A front road attribute calculation/storage unit 25, based on the information (see FIG. 3) for each node output from the navigation device 7, calculates an interval Lp between each node and the node directly in front and a curve's radius of curvature rp, sets singularity for each node, and stores calculated data as node attributes in a storage means such as RAM. The intersection attribute ip, road width attribute wp and others are also stored as node attributes in the storage means.

Figure 4:
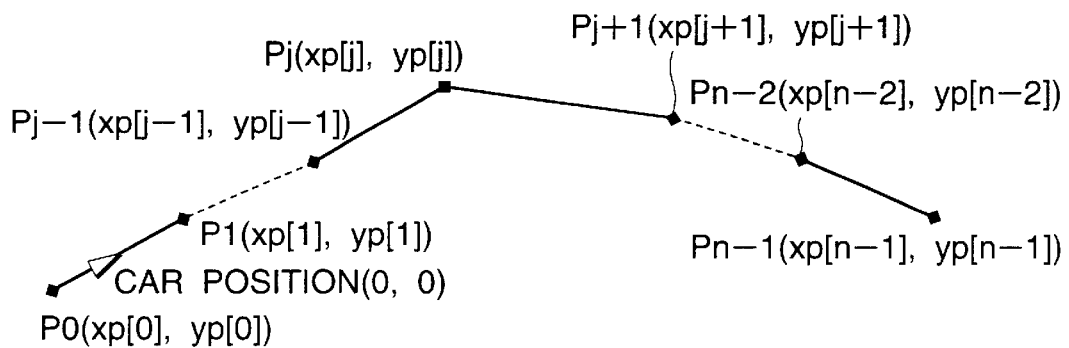
FIG. 4 is an explanatory diagram of node coordinates with the car position as a reference.

That is, based on node coordinates P0 (xp[0], yp[0]), P1 (xp[1], yp[1]), . . . Pj−1 (xp[j−1], yp[j−1]), Pj (xp[j], yp[j]), . . . Pn−1 (xp[n−1], yp[n−1]) output from the navigation device 7 while the car is running as shown in FIG. 4, the front road attribute calculation/storage unit 25 calculates a node interval Lp[j] between the node Pj and an adjacent node Pj−1 from the following equation.

$$Lp[j]=\{(xp[j]-xp[j-1])^2+(yp[j]-yp[j-1])^2\}^{1/2} \text{ where } 1 \leq j \leq n-1.$$

Next, the front road attribute calculation/storage unit 25 calculates a node angle tp[j] as a crossing angle between the node intervals Lp[j] and Lp[j+1] at the node Pj (see FIG. 5) from the following equation.

$$tp[j]=\sin^{-1}[\{(xp[j-1]-xp[j])\cdot(yp[j]-yp[j+1])-(xp[j]-xp[j+1])\cdot(yp[j-1]-yp[j])\}/(Lp[j]\cdot Lp[j+1])]$$

The node angle tp[j] obtained here is represented as a positive value for the right curve and a negative value for the left curve.

Figure 5:
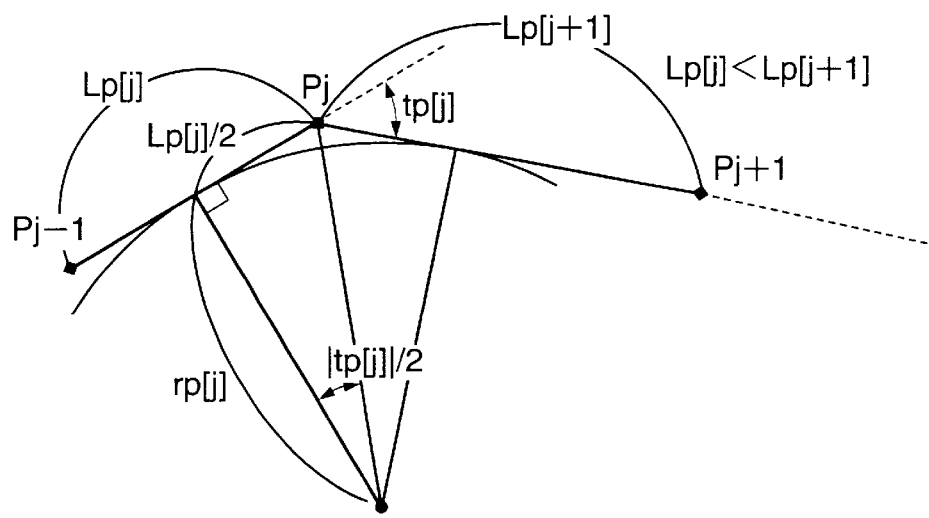
FIG. 5 is an explanatory diagram showing a method of calculating a curve's radius of curvature.

Then the front road attribute calculation/storage unit 25 calculates a curve's radius of curvature rp[j] at the node Pj from the following equation based on the node intervals Lp[j], Lp[j+1] and the node angle tp[j].

$$rp[j]=\min(Lp[j], Lp[j+1])/2/\tan(|tp[j]|/2)$$

where min (Lp[j], Lp[j+1]) means a selection of whichever node interval is shorter. In FIG. 5 because Lp[j]<Lp[j+1], the above formula can be rewritten as $$rp[j]=Lp[j]/2/\tan(|tp[j]|/2)$$

In each node, when there is an intersection, the value of an intersection flag output from the navigation device 7 is used as is and stored as an intersection attribute ip[j]. That is, the intersection attribute ip[j] is based on the value of the intersection flag issued from the navigation device and is set to the following values.

When the node of interest is at other than an intersection,
ip[j]=0.
When it is at an intersection,
ip[j]=1.
When it is at an intersection on a guided path in the navigation device 7,
ip[j]=2.

The road width attribute wp[j] representing the road width at each node is set by using a road width flag sent from the navigation device 7. The road width attribute wp[j] has the following values for actual road width ranges represented by the road width flag issued from the navigation device 7.

| Road width range indicated by flag | Road width attribute |
|---|---|
| 3 m or less | 3 m |
| 3–5.5 m | 5 m |
| 5.5–13 m | 10 m |
| 13 m or more | 15 m |

Further, the front road attribute calculation/storage unit 25 sets a singular point (node) which is to be removed from the calculation of the curve's radius of curvature. That is, the nodes stored in the CD-ROM of the navigation device 7 indicate the shape or geometry of the road but do not necessarily trace the center line of the road precisely. Generally, the nodes are plotted with some variations in the range of road width, as shown at node c or d of FIG. 8.

When the node angle at a node of interest is extremely bent compared with the road width and the node interval is abnormally short, the calculation of a curve's radius of curvature based on this node interval will produce a curve's radius of curvature which is far smaller than the actual road curve's radius of curvature. As a result, the alarm and deceleration controls are executed too sensitively when in fact the curve has a moderate curvature. Hence, such a node is removed as a singular point from the calculation to prevent the overly sensitive alarm or deceleration control.

Figure 8:
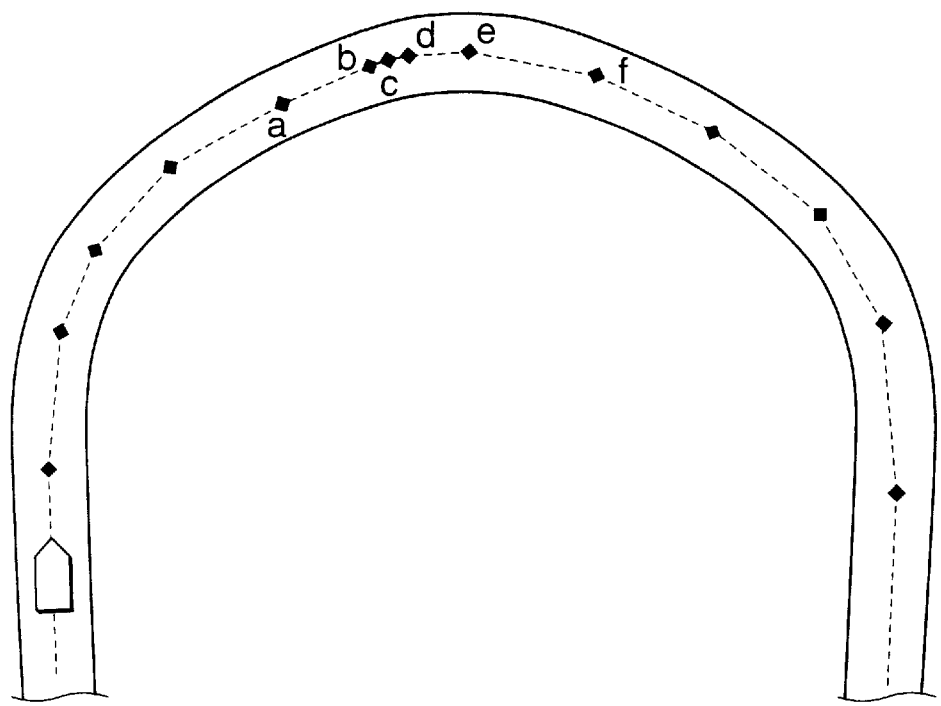
FIG. 8 is an explanatory diagram showing a state in which a curve's radius of curvature calculation exclusion point exists among the nodes making up the curve.

Whether each node is a singular point or not is indicated by a flag. The singularity flag=0 indicates that the node is normal and the singularity flag=1 indicates that the node is abnormal. The node with the singularity flag set to 1 constitutes a node that is to be removed from the curve's radius of curvature calculation. Suppose a curve's radius of curvature rp[d] for the node d of FIG. 8 is to be calculated, for example. When the preceding node c has its singularity flag set to 1, the node c is excluded and the curve's radius of curvature rp[d] is calculated based on the relation of the nodes b, d, e.

The conditions under which the singularity flag is set to 1 are as follows.

1) The node interval is extremely short.
2) The node angle is extremely large compared with the road width.

Further, when the nodes with their singularity flag set to 1 succeeds one after another, it is possible to invalidate the curve's radius of curvature calculated at a normal node, whose singularity flag is 0, immediately following the series of singular nodes in order to have the car move on without performing any control at that node.

The allowable lateral acceleration setting unit 26 calculates a reference value ayl1 of an allowable lateral acceleration ayl according to the road surface friction coefficient $\mu$, corrects the reference value ayl1 with the road gradient SL, sets an allowable lateral acceleration ayl2, corrects the allowable lateral acceleration ayl2 with a curve approach limit speed $((ayl1/rp[j])^{1/2})$ to set a final allowable lateral acceleration ayl.

Here, the reference value ayl1 is as disclosed in JP-A-11-83501 already filed by the applicant of this invention and can be determined from the following formula.

$$ayl1 = \mu \cdot K\mu \cdot g$$

where $K\mu$ is a safety factor and g is a gravity acceleration.

The allowable lateral acceleration ayl2 can be determined, for example, from the following equation.

$$ayl2 = (ayl1^2 - (g \cdot SL/100)^2)^{1/2}$$

Further, the allowable lateral acceleration ayl can be calculated, for example, from the following equation.

$$ayl = ayl2 \cdot Kv$$

where Kv is a car speed correction coefficient which is set so that it becomes smaller as the curve approach limit speed increases. That is, to enhance the safety during the high-speed cornering, the allowable lateral acceleration ayl at a curve is corrected to decrease as the curve approach limit speed increases.

Figure 2:
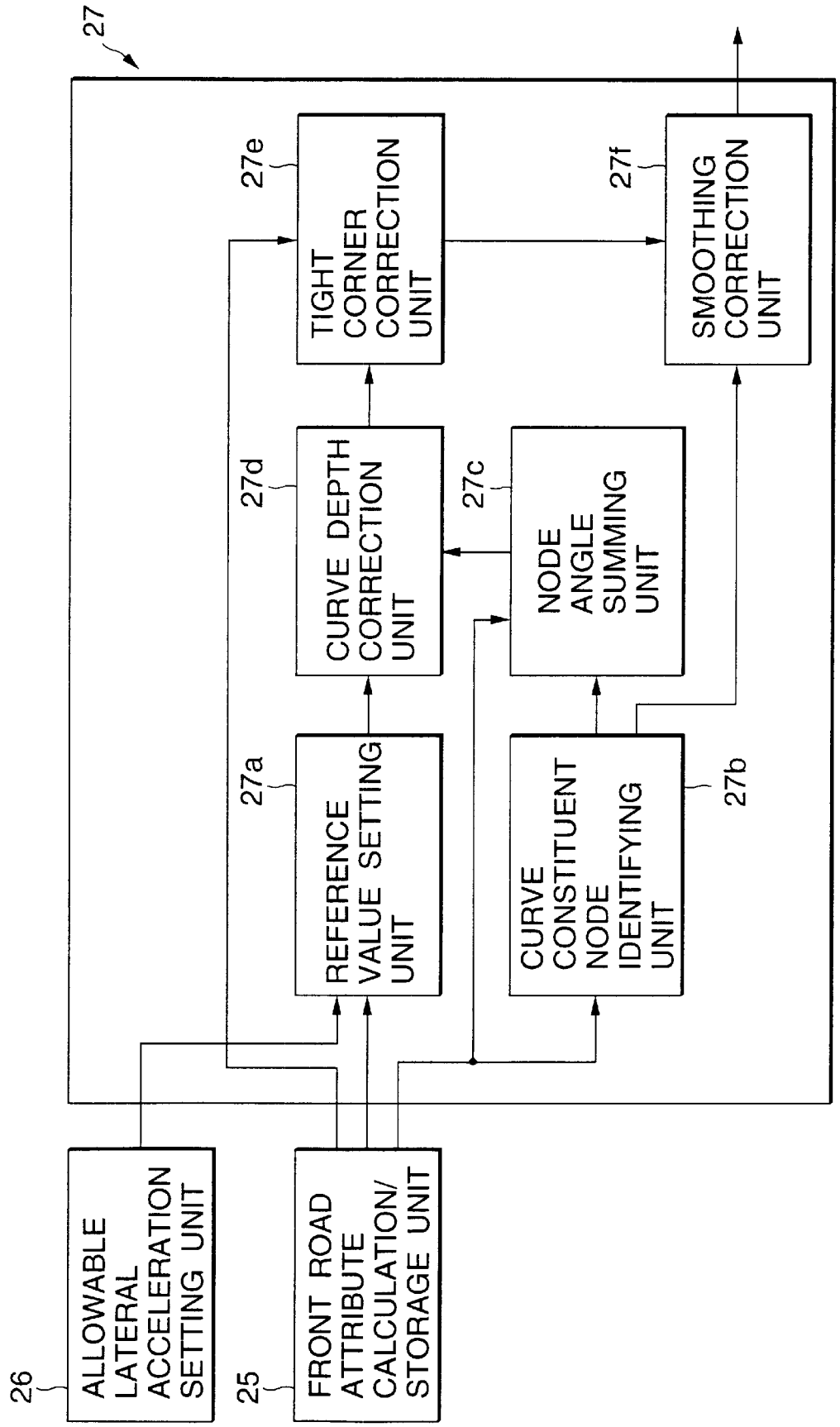
FIG. 2 is a functional block diagram of an allowable approach speed setting unit.

The allowable lateral acceleration ayl is read into the allowable approach speed setting unit 27. As shown in FIG. 2, the allowable approach speed setting unit 27 includes a reference value setting unit 27a, a curve constituent node identifying unit 27b, a node angle summing unit 27c, a curve depth correction unit 27d, a tight corner correction unit 27e, and a smoothing correction unit 27f.

As following equation, the reference value setting unit 27a calculates a reference value vap0 of the allowable approach speed for each node Pj according to the allowable lateral acceleration ayl set by the allowable lateral acceleration setting unit 26 and the curve's radius of curvature rp[j] stored in the front road attribute calculation/storage unit 25.

$$vap0 = (ayl \cdot |rp[j]|)^{1/2}$$

The curve constituent node identifying unit 27b identifies a group of nodes that make up the same curve and is intended to correct the allowable approach speed reference value vap0 with a curve depth (opening angle) tpa described later and then smooth out the allowable approach speeds of the nodes in the same curve.

Figure 6:
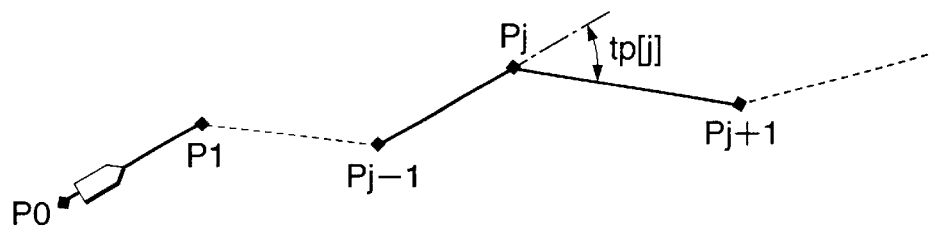
FIG. 6 is an explanatory diagram when a curve is made up of one node.
Figure 7:
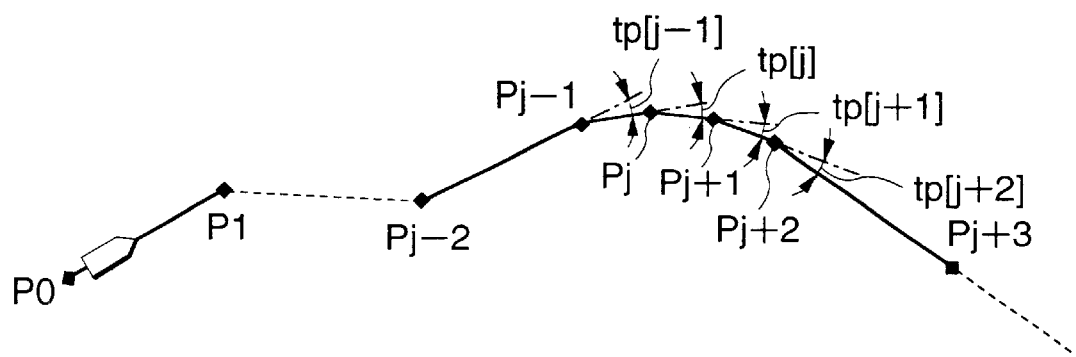
FIG. 7 is an explanatory diagram when a curve is made up of a plurality of nodes.

There are two patterns of a curve: one made up of one node Pj as shown in FIG. 6 and one made up of a plurality of nodes Pj−1, Pj, . . . as shown in FIG. 7.

Whether the adjacent nodes Pj−1, Pj belong to the same curve or not is judged by the node interval Lp[j] between the nodes and the signs of the node angles tp[j−1], tp[j] (positive value (+) or negative value (−)).

That is, if the node interval Lp[j] is smaller than a predetermined value (LK·wp[j], LK: constant) (Lp[j]< (LK·wp[j]) and the signs of the node angles tp[j−1], tp[j] are the same, it is determined that the nodes Pj−1 and Pj belong to the same curve.

Under this condition, the nodes Pj−1, Pj, Pj+1, Pj+2 shown in FIG. 7 are checked and it is found that they belong to the same curve.

The node angle summing unit 27c sums up the node angles of the nodes that were judged by the curve constituent node identifying unit 27b as making up one and the same curve to calculate the curve depth tpa.

In FIG. 7, the curve depth tpa at the node Pj is given by $$tpa = tp[j-1] + tp[j]$$

Similarly the curve depth tpa at the node Pj+1 is given by $$tpa = tp[j-1] + tp[j] + tp[j+1]$$

The curve depth tpa at the node Pj+2 is given by $$tpa = tp[j-1] + tp[j] + tp[j+1] + tp[j+2]$$

The node Pj−1 shown in FIG. 7 is the start point of the curve and the curve depth tpa at the node Pj−1 is given by $$tpa=tp[j-1]$$

Further, when the same curve is made up of a single node Pj, as shown in FIG. 6, the curve depth tpa of this node Pj is determined by substituting the node angle tp[j] as is. That is, $$tpa=tp[j]$$

The curve depth correction unit 27d corrects the allowable approach speed reference value vap0 set by the reference value setting unit 27a with a curve depth correction coefficient kt according to the following formula to calculate the allowable approach speed vap1 (m/sec).

$$vap1=vap0\cdot kt$$

The curve depth correction coefficient kt is set so that it gradually decreases as the curve depth tpa increases. That is, the correction is performed in such a way that the allowable approach speed correction value vap1 decreases as the curve depth tpa increases.

The tight corner correction unit 27e compares a predetermined value $(ayl\cdot wp\cdot rwk)^{1/2}$ corresponding to the road width wp[j] with the allowable approach speed vap1 determined by the curve depth correction unit 27d, selects whichever is larger, and sets the selected value as the allowable approach speed vap2.

$$vap2=\max\{vap1, (ayl\cdot wp\cdot rwk)^{1/2}\}$$

where the setting ratio rwk is a constant multiple of the road width wp, such as 1, 1.5, 2 and 3. It may be a fixed value or variable value. If a variable value is used, it is changed according to the direction of curve or the road kind.

As a result, when the curve is a tight corner with a narrow road width wp[j], a predetermined value $(ayl\cdot wp\cdot rwk)^{1/2}$ corresponding to the road width attribute wp[j] is set as the allowable approach speed vap2, thus preventing the allowable approach speed from being set to an extremely small value and avoiding too responsive an alarm control.

The smoothing correction unit 27f smoothes the allowable approach speeds vap2 of the nodes that were identified by the curve constituent node identifying unit 27b as existing on the same curve. For example, in FIG. 7, the smoothing processing is performed on the allowable approach speeds vap2[j−1], vap2[j], vap2[j+1], vap2[j+2] at the nodes Pj−1, Pj, Pj+1, Pj+2. In this case, when the node interval Lp[j] is larger than a predetermined value (WK2·wp[j], WK2: constant) (Lp[j]≧WK2·wp[j]), the smoothing processing is not executed and the allowable approach speeds vap2 calculated at individual nodes are set as final allowable approach speeds vap for the respective nodes.

The reason for performing the smoothing operation on the allowable approach speeds is as follows.

Even in the same curve there are variations in the allowable approach speed vap2 among a plurality of nodes making up the curve. If the alarm and deceleration controls are carried out based on the minimum value of the allowable approach speeds, the alarm and deceleration controls become very sensitive. To prevent this, if the alarm and deceleration controls are based on a simple average of the allowable approach speeds vap2 of these nodes, the controls are strongly influenced by a node with a large allowable approach speed, rendering the controls unresponsive. To avoid this problem, this embodiment performs the correction on the allowable approach speed vap2 of each of the constituent nodes.

The correction is made by comparing the allowable approach speed of the node Pj of interest with the averages of the allowable approach speeds of the node Pj and the immediately preceding and following nodes Pj+1, Pj−1, and taking a median value as a final allowable approach speed vap for the node Pj.

For example, in FIG. 7, 1) the allowable approach speed vap2[j] of the node Pj is read;

2) an average vap21 is calculated as the averages of the allowable approach speed vap2[j] of the node Pj and the allowable approach speed vap2[j+1] of the next node Pj+1

$$vap21=(vap2[j]+vap2[j+1])/2$$

and 3) an average vap20 is calculated as the averages of the allowable approach speed vap2[j] of the node Pj and the allowable approach speed vap2[j−1] of the immediately preceding node Pj−1;

$$vap20=(vap2[j-1]+vap2[j])/2$$

Then, the median value of vap2[j], vap21 and vap20 is taken as the final allowable approach speed vap for the node Pj.

For a node which is at the start of a curve, an average of the allowable approach speeds of the node and the next node is adopted. For a node which is at the end of the curve, the allowable approach speed of the node is compared with the average of the allowable approach speeds of the node and the preceding node, and whichever is larger is adopted.

In this case, the averages vap21, vap20 may be determined from the square values as follows.

$$vap\,21=[(vap2[j]^2+vap2[j+1]^2)/2]^{1/2}$$

$$vap\,20=[(vap2[j-1]^2+vap2[j]^2)/2]^{1/2}$$

If there is a node with its singularity flag set to 1 when performing the smoothing processing, that node is taken as a curve s radius of curvature calculation exclusion point and the allowable approach speed of the adjacent node is used.

That is, in a curve that has successive nodes a, b, c, d, e, f lying in that order ahead of the car as shown in FIG. 8, suppose the node c of interest has the singularity flag set to 1. In that case, the allowable approach speeds vap2[b], vap2[d], vap2[e] calculated for the nodes b, d, e are used.

When the car is negotiating a curve, the final allowable approach speed vap for a node immediately in front of the car can be determined in the similar manner by using the allowable approach speeds vap2 of the node immediately in front of the car or immediate node, of a node directly preceding the immediate node (passed node), and of a node directly following the immediate node.

In FIG. 8, however, when the node c with the singularity flag set to 1 is the passed node, the calculation of the allowable approach speed vap at the node d becomes impossible. That is, the allowable approach speed vap of the node d, which is immediately in front of the car, must be set based on the second allowable approach speed correction value that was determined for the nodes b, d, e. The information on nodes behind the passed node (the node that the car has just passed) is not supplied from the navigation device 7 because the information on the node b has been erased.

In such a case, the allowable approach speed vap at the node d is obtained by comparing the allowable approach speed vap that was set in the past and the allowable approach speed vap2[d] that is calculated this time and taking whichever is larger as the current allowable approach speed vap.

For each of the n nodes output from the navigation device 7 which range from a node coordinate P0, which the car has just passed, to a node coordinate Pn−1, which is farthest, the alarm speed calculation/storage unit 28 determines an alarm speed vw[j] at the present car position by using the allowable approach speed vap[j] set by the allowable approach speed setting unit 27, the node interval Lp[j] for each node stored in the front road attribute calculation/storage unit 25, and the allowable deceleration XgLim set by the allowable deceleration setting unit 24.

The distance LL[j] from the car position to each node is expressed as follows.

When $j=1$, $LL[j] = (xp[1]^2 + yp[1]^2)^{1/2}$

When $2 \leq j < n-1$, $LL[j] = LL[1] + Lp[2] + Lp[3] + \ldots + Lp[j]$

From these, the alarm speed vw[j] for each node can be set as follows.

$vw[j] = (vap[j]^2 + 2 \cdot (Kx \cdot XgLim) \cdot LL[j])^{1/2}$ where Kx is a safety factor and in this embodiment 0.5, which means that 50% of the allowable deceleration XgLim is taken as the safe deceleration.

The alarm decision output unit 29 compares the minimum of the alarm speeds vw[j] for the nodes determined by the alarm speed calculation/storage unit 28 with the car speed v calculated based on the output signal from the car speed sensor 5, and also compares the car speed v with the allowable approach speed vap[j] of the node that has the minimum alarm speed vw[j].

Then, if the car speed v is larger than the minimum alarm speed vw[j] and the difference between the car speed v and the allowable approach speed vap[j] is equal to or more than the allowable value vk1 (for example, 5 km/h), it is decided that the car is running in an overspeed state.

Figure 9:
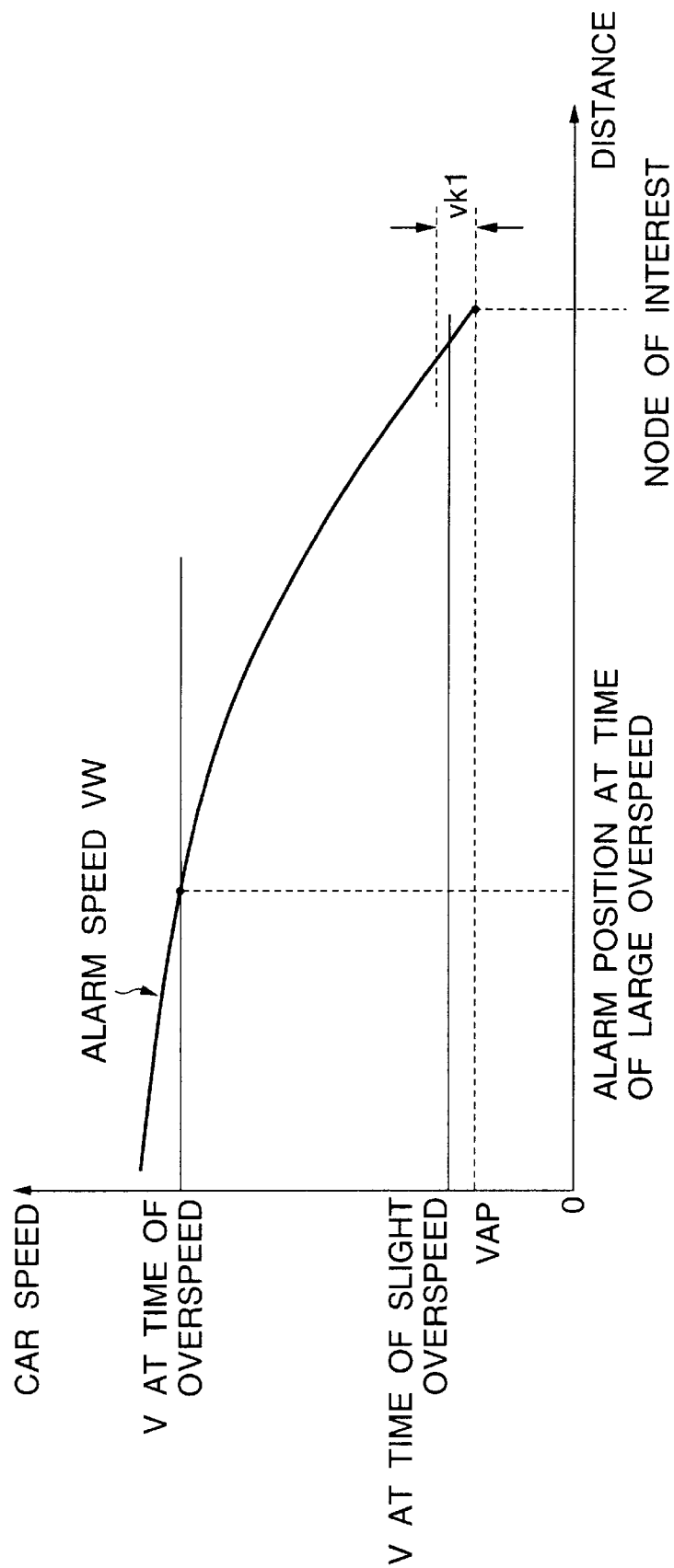
FIG. 9 is a characteristic diagram showing the relation between a car speed and an alarm speed.

Therefore, when the car is traveling at a constant speed v as shown in FIG. 9 and this car speed v somewhat exceeds the alarm speed vw[j], an alarm is issued early or deceleration control is initiated. When on the other hand the amount by which the car speed v exceeds the allowable approach speed vap[j] is equal to or less than the allowable value vk1, it is only when the car position comes very close to the position of the node under consideration that the car speed v will exceed the alarm speed vw[j]. At this time the alarm and deceleration controls are not performed. This is because the allowable approach speed vap incorporates a safety margin in advance and therefore no practical problem will arise.

When the node is judged by the alarm decision output unit 29 as a node to be covered by the alarm control and the driver has not performed an appropriate deceleration operation for a predetermined time (or example, 2 seconds), a deceleration decision output unit 30 decides that the node should be subjected to the deceleration control. In this embodiment, a brake pressure is detected from the output signal from the brake pressure sensor 9 and, based on the brake pressure, a check is made of whether the braking operation on the part of the driver has achieved the deceleration set by the allowable deceleration setting unit 24. If the set deceleration is not realized, the node is judged as an object for the deceleration control.

A control execution decision unit 31 checks whether or not to permit the actual control to be performed on the node that was judged by the alarm decision output unit 29 as an object for the alarm control or on the node that was judged by the deceleration decision output unit 30 as an object for the deceleration control.

That is, first, for the node that has been judged as an object for the alarm control, the control execution decision unit 31 checks whether the node of interest actually exists on the road as by reading the curve's radius of curvature rp at the node from the road attribute stored in the front road attribute calculation/storage unit 25, reading the distance LL to the node stored in the alarm speed calculation/storage unit 28, and checking the curve's radius of curvature rp and the distance LL against the degree of curvature of the road in front and the distance to the curve start point, both recognized by the road shape detection device 10. When they agree, the control execution decision unit 31 decides that the node of interest actually exists on the road and permits the execution of the alarm or deceleration control. When they do not agree, the road information in the map stored in the storage means such as CD-ROM of the navigation device 7 is considered to differ from the actual road state due to road extension or modification constructions. Thus, the control execution decision unit 31 prohibits the execution of the alarm and deceleration control for that node.

When the control execution decision unit 31 permits the execution of the alarm control or the deceleration control for the node under consideration, the alarm decision output unit 29 outputs an alarm command signal to the alarm device 11 to inform and alert the driver that the car is on the verge of entering a curve. At the same time, the deceleration decision output unit 30 outputs a deceleration command signal to the deceleration device 12, which, based on the deceleration command from the deceleration decision output unit 30, performs a forced deceleration operation as by shifting down the transmission, reducing the engine torque and braking.

As described above, because in this embodiment the allowable approach speeds for the consecutive nodes set in the same curve are smoothed out when the allowable approach speed is calculated for each node, variations of the allowable approach speeds individually set for respective nodes in the same curve can be corrected, allowing appropriate alarm and deceleration controls that match the actual road curve to be performed.

According to this invention, because, when a plurality of nodes make up the same curve, the allowable approach speeds calculated for the respective nodes are smoothed out between adjacent nodes, the variations in the allowable approach speed among these nodes in the same curve can be corrected, allowing appropriate alarm and deceleration controls that match the actual road curve to be executed.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A curve approach speed control apparatus comprising:
   a processing unit for calculating at least a radius of curvature of a curve in front of a road to be negotiated based on a plurality of node data for the road output from a navigation device and setting an allowable approach speed for the curve based on the curve's radius of curvature; and
   a smoothing correction unit for smoothing allowable approach speeds calculated for a plurality of nodes consecutively set in the same curve between adjacent nodes.

2. The curve approach speed control apparatus according to claim 1, wherein said smoothing correction unit compares three values, the three values comprising an average of an allowable approach speed calculated for a node of interest and an allowable approach speed calculated for a preceding node, an average of the allowable approach speed calculated for the node of interest and an allowable approach speed calculated for a following node, and the allowable approach speed calculated for the node of interest, and sets a median value of the three values as the allowable approach speed of the node of interest.

3. The curve approach speed control apparatus according to claim 1, wherein said smoothing correction unit sets an average of the allowable approach speed calculated for a node of the interest at a start of the curve and an allowable approach speed calculated for a following node as an allowable approach speed of the node of interest.

4. The curve approach speed control apparatus according to claim 1, wherein said smoothing correction unit compares an allowable approach speed calculated for a node of interest at an end of the curve with an average of the allowable approach speed calculated for the node of interest and an allowable approach speed calculated for a preceding node, and sets a larger value between two values as an allowable approach speed for the node of interest.

5. The curve approach speed control apparatus according to claim 1, wherein smoothing correction processing of said smoothing correction unit is not performed when a node interval of a node of interest is equal or larger than a set value corresponding to a road width.

6. A method for curve approach speed control comprising:

processing for calculating at least a radius of curvature of a curve in front of a road to be negotiated based on a plurality of node data for the road output from a navigation device;

setting an allowable approach speed for the curve based on the curve's radius of curvature; and smoothing correction for smoothing allowable approach speeds calculated for a plurality of nodes consecutively set in the same curve between adjacent nodes.

7. The method for curve approach speed control according to claim 6, wherein said smoothing correction step comprises:

comparing for comparing three values, the three values for a node of interest and an allowable approach speed calculated for a preceding node, an average of the allowable approach speed calculated for the node of interest and an allowable approach speed calculated for a following node, and the allowable approach speed calculated for the node of interest, and setting for a median value of the three values as the allowable approach speed of the node of interest.

8. The method for curve approach speed control according to claim 6, wherein said smoothing correction step comprises:

setting for setting an average of the allowable approach speed calculated for a node of interest at a start of the curve and an allowable approach speed calculated for a following node as an allowable approach speed of the node of interest.

9. The method for curve approach speed control according to claim 6, wherein said smoothing correction step comprises:

comparing for comparing an allowable approach speed calculated for a node of interest at an end of the curve with an average of the allowable approach speed calculated for the node of interest and an allowable approach speed calculated for a preceding node; and setting for setting a larger value between two values as an allowable approach speed for the node of interest.

10. The method for curve approach speed control according to claim 6, wherein smoothing correction processing of said smoothing correction step is not performed when a node interval of a node of interest is equal to or larger than a set value corresponding to a road width.

* * * * *